United States Patent [19]

Nadas

[11] Patent Number: 4,573,553
[45] Date of Patent: Mar. 4, 1986

[54] DISC BRAKE

[75] Inventor: Julius Nadas, Eching, Fed. Rep. of Germany

[73] Assignee: Knorr-Bremse GmbH, Munich, Fed. Rep. of Germany

[21] Appl. No.: 632,928

[22] Filed: Jul. 20, 1984

[30] Foreign Application Priority Data

Jul. 21, 1983 [DE] Fed. Rep. of Germany ....... 3326372

[51] Int. Cl.⁴ .............................................. B61H 5/00
[52] U.S. Cl. .................................. 188/59; 188/153 A
[58] Field of Search ................. 188/58, 59, 72.4, 72.5, 188/72.6, 72.7, 72.9, 76, 153 A, 170

[56] References Cited

U.S. PATENT DOCUMENTS

| | | | |
|---|---|---|---|
| 3,489,022 | 1/1970 | Krahl | 188/59 X |
| 3,645,364 | 2/1972 | Otto et al. | 188/59 X |
| 3,876,043 | 4/1975 | Frania et al. | 188/59 X |

Primary Examiner—Duane A. Reger
Attorney, Agent, or Firm—Pollock, Vande Sande & Priddy

[57] ABSTRACT

Disc brake for rail vehicles having a brake clamp (7) located in one plane and having two brake levers (4) having their central portions connected by a pull rod (5). The latter is formed with a rotatable threaded spindle (9) as a stay, which spindle is rotatable from the brake cylinder (15) by means of a turning lever having a play adjustment device. The axle (16) of the brake cylinder (15) extends perpendicularly to the plane (8) of the brake clamp (7) between the two brake levers (4) and between the pull rod (5) and a bearing block (6) for the brake lever ends, at a distance from the brake disc. The brake cylinder (15) carries the bearing block for the brake lever ends and a carrier arm (22) for the pendulum suspensions (24) of the brake shoes (2).

8 Claims, 6 Drawing Figures

4,573,553

DISC BRAKE

FIELD OF THE INVENTION

The present invention relates to a disc brake for rail vehicles having a brake clamp arranged in a plane and being clampable by a brake cylinder. On its ends facing the brake disc, the brake clamp has two brake levers carrying brake shoes, these brake levers being flexibly connected at their central portions by a pull rod whose length is adjustable and which may have an automatic play adjustment device.

BACKGROUND OF THE INVENTION

This type of disc brake is known, e.g., from German Patent No. 2,346,828. The brake cylinder arranged in the plane of the brake clamp here engages the ends of the brake levers remote from the brake disc in such a manner that in operation it tends to spread apart these brake lever ends. The pull rod of the brake clamp is provided in a turnbuckle manner with a threaded spindle having two sections with opposed threading and with nuts corresponding to these sections, the brake levers being swingably articulated to these nuts. The brake cylinder is coupled to a turning device for the threaded spindle by way of a relatively weak, Bowden-type linkage and a stop coupling, so that, when the brake cylinder piston exceeds a predetermined distance of travel, the threaded spindle is rotated so as to reduce the distance between the two nuts. In this as well as similar constructions of a disc brake, the brake cylinder occupies substantial space and may require a floating attachment to the rail vehicle, necessitating special support and guide means for the brake clamp and/or the brake cylinder.

For other types of disc brakes, e.g., as disclosed in British Patent No. 957,598, it is known to convert the stroke of the brake cylinder (which may be spring-loaded) to rotational movement of a threaded spindle having a play adjustment device and actuating the disc brake. In this case, too, the brake cylinder requires a great volume, so that the disc brake in turn requires a relatively large mounting space.

For use in vehicle brakes, many kinds of turn levers are known, e.g., from European Patent No. 30,766 and German No. 25 06 428, which are supported during their turning movement on shafts causing brake clamping, and whose ends are to be articulated to the piston rods of brake cylinders. Such turn levers are normally provided with manual or automatic play adjustment devices.

The suspension of brake shoes by means of pendulum suspensions articulated directly or indirectly to such brake shoes and to the rail vehicle is generally known in the disc brake art.

OBJECT OF THE INVENTION

The object of this invention is a disc brake of the type described which is simple to construct and which requires only a small assembly space, yet enables an equally economical and space-saving support on the rail vehicle, as well as provision of a play adjustment device.

SUMMARY OF THE INVENTION

According to the invention, this object is achieved by arranging the brake cylinder in at least substantially perpendicular axial direction with respect to the plane of the brake clamp, above or below the central region of the brake clamp, by coupling the piston rod of the brake cylinder by way of a power ratio drive to a longitudinal adjustment element of the pull rod, in such manner that actuation of the brake cylinder causes shortening of the pull rod, the two ends of the brake lever which are remote from the brake disc are flexibly braced, directly or indirectly, possibly against one another, and by providing on the brake cylinder attached to the rail vehicle support means for pendulum suspension of the brake shoes and rotatable mounting of the ends of the brake levers which are remote from the brake disc.

BRIEF DESCRIPTION OF THE DRAWINGS

In order that the invention may be more clearly understood, reference will now be made to the accompanying drawings, wherein several embodiments are shown for purposes of illustration, and wherein.

DESCRIPTION OF PREFERRED EMBODIMENT

Figure 1:
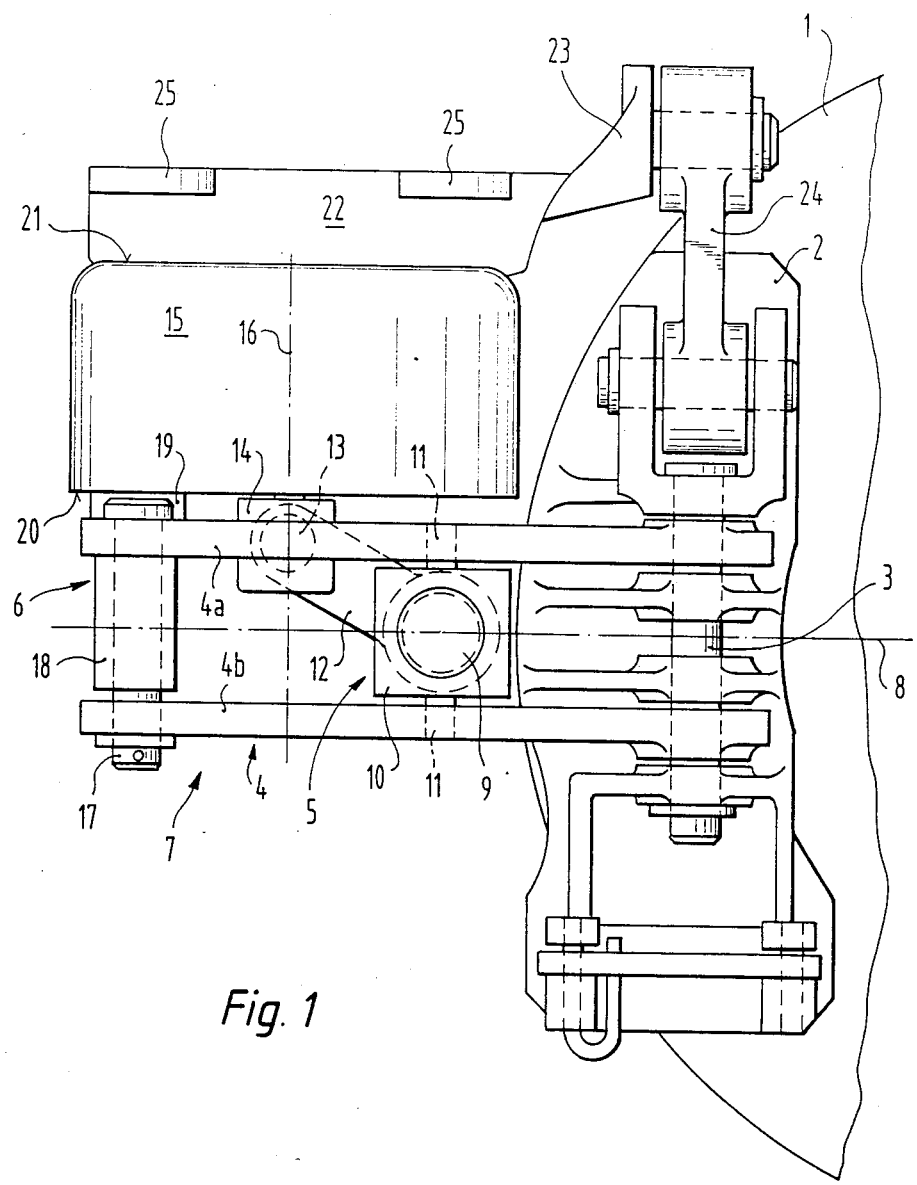
FIG. 1 is a side view of a first embodiment of the invention.
Figure 2:
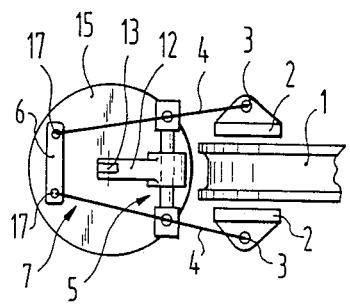
FIG. 2 is a schematic view from below of the disc brake of FIG. 1.
Figure 3:
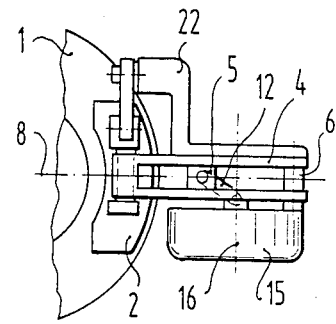
FIGS. 3 to 6 are schematic side views of several embodiments of the disc brake according to the invention.

As shown in FIGS. 1 and 2, the disc brake has, on both sides of a brake disc 1, brake shoes 2 which are swingably articulated by means of bolt 3 to the end of brake levers 4 adjacent to the brake disc. According to FIG. 1, levers 4 are double levers 4a, 4b. They extend in a generally radial direction away from brake disc 1, and are flexibly connected to one another at their longitudinally central regions by a pull rod 5, and are articulated at their ends remote from the brake disc by a bearing block 6. In combination with brake shoes 2 and pull rod 5, the two brake levers 4 form a brake clamp 7, substantially in, or symmetrical with, a plane 8 which includes the axis of brake disc 1. Pull rod 5 is formed as a turnbuckle, comprising a threaded spindle 9 which has threaded sections on both sides with opposite pitches. These sections are each screwed to a nut 10, cubic-shaped in front view, having bolt projections 11 on which brake levers 4 are swingably supported in their longitudinally central portions. Between the two brake levers 4, a turn lever 12 is positioned on threaded spindle 9. This turn lever extends away from brake disc 1, in slight inclination to plane 8, and has an end articulated to the piston rod 14 of a brake cylinder 5 by means of a bearing 13. Turn lever 12 can be provided with a manual or automatic play adjustment device, in a manner known per se.

The axis 16 of brake cylinder 15 extends perpendicularly to plane 8 between the two brake levers 4 and between pull rod 5 and bearing block 6. In the embodiment shown in FIG. 1, brake cylinder 15 is then immediately above brake clamp 7. Bearing block 6 has a generally inverted T-shape, at the ends of whose cross beam 18 the two ends of brake levers 4 remote from the brake disc are articulated by means of bolt 17. Crosspiece 19, extending upwardly from cross beam 18 of bearing block 6, is attached at its upper end to a portion of cylinder cover 20 which is remote from brake disc 1. Bottom 21 of brake cylinder 15 is connected to a supporting arm 22 which projects in the direction of brake disc 1 and at whose upper end 23 are articulated the upper ends of pendulum suspensions 24, also articulated to brake shoes 2. Supporting arm 22 has attachment lugs 25 by which it can be attached, preferably by means of screws, to the frame of a rail vehicle.

Upon pressure medium loading of brake cylinder 15, its piston rod 14 is extended downwardly, rotating turn lever 12 together with threaded spindle 9, thereby screwing nuts 12 in converging directions and clamping brake clamp 7, forcing brake shoes 2 against brake disc 1. Brake release proceeds in the converse manner. In release position of the disc brake, the distance between nuts 10 can be so adjusted by means of the referred to play adjustment device that, in a given position of turn lever 12, brake shoes 2 are always retained at the same distance from brake disc 1 by corresponding rotation of threaded spindle 9, independently of their degree of wear.

As clearly shown in FIGS. 1 and 2, the disc brake is extremely compact and requires little assembly necessitating space, and is easily mountable on the rail vehicle as a complete unit by means of attachment lugs 25.

Where required, brake cylinder 15 can also be arranged below plane 8 of brake clamp 7. In that case, supporting arm 22, together with bearing block 6, is arranged on sides of cylinder cover 20 and has an upwardly offset shape, as shown in FIG. 2.

Figure 4:
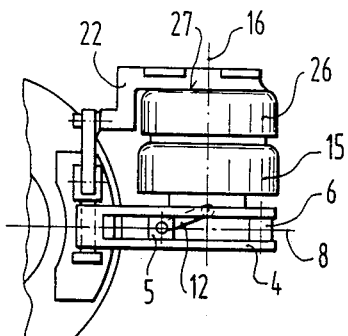
Figure 5:
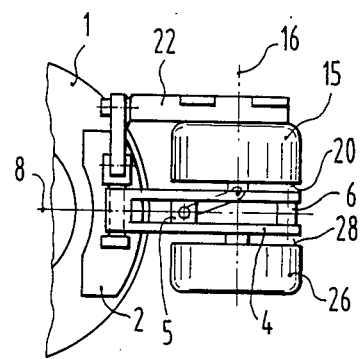

As shown in FIG. 4, if spring-loaded actuation of the disc brake is to be provided in addition to brake cylinder 15, a spring-loaded brake cylinder 26 can be piggybacked onto brake cylinder 15 and supporting arm 22 can be attached to the cylinder bottom 27 of such cylinder 26. In this embodiment, supporting arm 22 can have a downwardly offset shape.

Where the supplemental spring-loaded brake cylinder 26 is used, it may be desirable to locate the same below the plane 8 of brake clamp 7. In this case, cylinder cover 20 of brake cylinder 15 may be connected to cylinder cover 28 by means of suitable spacers (not shown in FIG. 5). Bearing block 6 could serve as such a spacer.

Figure 6:
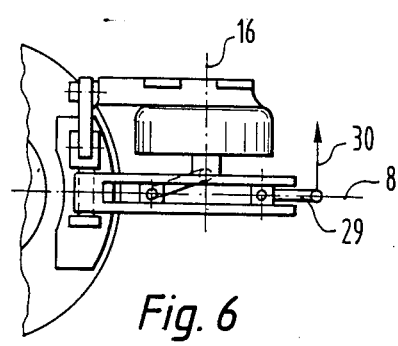

If the disc brake is also to be mechanically clampable, it is desirable also to constitute cross beam 18 of bearing block 6 as a turnbuckle, like pull rod 5. This requires threaded spindle 9 to be provided with a turn lever 29 which can be acted upon by the mechanical brake clamping force in the direction of arrow 30. Turn lever 29 then turns threaded spindle 29 in the spreading direction of the nuts screwed thereto and articulated to the ends of brake levers 4, whereby brake clamp 7 is clamped in the usual manner (FIG. 6).

In all embodiments, turn lever 12, in combination with threaded spindle 9 and nuts 10 constitutes a power ratio drive having a high degree of conversion, so that the diameter of the brake cylinder, and thus the mounting space required for the disc brake, can be kept particularly small. It is also possible, however, to utilize other kinds of power ratio drives, e.g., in the form of a V-drive in which the wedge which, upon its actuation moves the brake levers 4 closer, is itself movable by the piston rod of the brake cylinder.

What is claimed is:

1. Disc brake for rail vehicles, with a brake clamp (7) arranged in a plane (8) and clampable by means of a brake cylinder (15) having a piston rod (14) and comprising two brake levers (4) carrying brake shoes (2) at their ends facing the brake disc, said brake levers being articulated to one another in their central regions by means of a pull rod (5) adjustable for longitudinal play and actuated by said brake cylinder, wherein
   (a) said brake cylinder (15) is arranged in at least substantially perpendicular axial direction (16) with respect to the plane (8) of said brake clamp (7) adjacent a central region of the latter;
   (b) said piston rod (14) is coupled by way of a power ratio drive to a longitudinal adjustment element (9) of said pull rod (5), in such manner that actuation of said brake cylinder (15) causes shortening of said pull rod (5);
   (c) means being provided for flexibly bracing the two ends of said brake levers; and
   (d) said brake cylinder (15) held fast to the rail vehicle is provided with support means (22) on said brake cylinder (15) for pendulum suspension of said brake shoes (2) and rotatable mounting of the ends of said brake levers (4) remote from said brake disc.

2. Disc brake according to claim 1, comprising a rotatable screw element (9) of said pull rod (5), which is formed as a turnbuckle, coupled, with play adjustment, with a turn lever (12) extending substantially between said brake levers (4) and away from said brake disc (1), an end of said turn lever being articulated to said piston rod (14) in said brake cylinder (15).

3. Disc brake according to claims 1 or 2, wherein the body of said brake cylinder (15) on the brake disc side has a carrier arm (22) projecting in the direction of said brake disc side adjacent a bottom (21) of said brake cylinder (15) at least substantially parallel to the plane (8) of said brake clamp (7), the pendulum suspension (24) for said brake shoes (2) being articulated to an end of said carrier arm.

4. Disc brake according to claim 1 or 2, comprising a spring-loaded brake cylinder (26) coaxial with said brake cylinder (15) and having a piston rod coupled with said turn lever (12).

5. Disc brake according to claim 4, wherein said spring-loaded brake cylinder (26) is pivoted on said brake cylinder (15).

6. Disc brake according to claim 4, wherein said brake cylinder (15) and said spring-loaded brake cylinder (26) are arranged in substantially mirror image relation on opposite sides of the plane (8) of said brake clamp (7).

7. Disc brake according to claim 1 or 2, wherein the body of said brake cylinder (15) has, at a location of its cover (20) remote from said brake disc, a substantially T-shaped bearing block (6) for articulation to the ends of said brake lever (4) formed as a double lever (4a, 4b), said bearing block (6) being attached to said cover (20) and its cross beam (18) being articulated at its ends to said brake levers (4).

8. Disc brake according to claim 1 or 2, wherein the brace of the ends of said brake lever (4) remote from said brake disc is provided with mechanical means (29) for spreading apart said ends of said lever.

* * * * *